United States Patent
Hayamizu et al.

[15] 3,637,282
[45] Jan. 25, 1972

[54] ELONGATED VARIABLE MAGNIFICATION OPTICAL SYSTEM HAVING SELECTIVELY INTERCHANGEABLE LENSES

[72] Inventors: Yoshisada Hayamizu; Toshiyuki Mori; Rikizo Murata, all of Tokyo, Japan

[73] Assignee: Olympus Optical Co., Inc., Tokyo, Japan

[22] Filed: Feb. 21, 1970

[21] Appl. No.: 4,728

Related U.S. Application Data

[63] Continuation-in-part of Ser. No. 634,931, May 1, 1967, abandoned.

[30] Foreign Application Priority Data

May 11, 1966 Japan..................................41/29377

[52] U.S. Cl..........................350/39, 350/96 B, 350/175 TS, 350/183, 350/205
[51] Int. Cl.......................................G02b 5/16, G02b 15/06
[58] Field of Search ..............350/96, 183, 175 TS, 205, 37, 350/38, 39

[56] References Cited

UNITED STATES PATENTS

| | | | |
|---|---|---|---|
| 2,237,943 | 4/1941 | Lihotzky | 350/183 UX |
| 2,651,970 | 9/1953 | Tiller | 350/175 TS UX |
| 3,278,752 | 10/1966 | Brixner | 350/205 X |

FOREIGN PATENTS OR APPLICATIONS

| 1,425,097 | 12/1965 | France | 350/96 |
|---|---|---|---|

Primary Examiner—John K. Corbin
Attorney—Wenderoth, Lind and Ponack, John E. Lind, Vincent M. Creedon and John T. Miller

[57] ABSTRACT

An elongated variable magnification optical system comprising an objective lens located in front of an image transmitting optical system, the objective lens being adapted to focus the image of an object on the front end surface of the image transmitting optical system, an aperture diaphragm located at a position adjacent to the front focal point of the objective lens, selectively interchangeable lens systems each selectively located in front of the aperture diaphragm thereby permitting the magnification of the entire optical system to be varied by interchanging the interchangeable lens system. A further additional lens system may be located at a position adjacent to the aperture diaphragm in such a manner that the rear principal plane of the further additional lens system is positioned adjacent to the front focal point of the objective lens, thereby permitting the rear focal plane of the combined optical system located in front of the image transmitting optical system to be shifted within an appropriate range without varying the focal length of the combined optical system.

10 Claims, 2 Drawing Figures

ELONGATED VARIABLE MAGNIFICATION OPTICAL SYSTEM HAVING SELECTIVELY INTERCHANGEABLE LENSES

This application is a continuation-in-part of U.S. Pat. application Ser. No. 634,931, filed May 1, 1967, now abandoned.

BACKGROUND OF THE INVENTION

The present invention relates to an elongated variable magnification optical system and more particularly to an elongated image-transmitting optical system in which the magnitude of the image formed by the objective lens can be varied without requiring any complicated means.

It was well known in the field of elongated image-transmitting optical systems such as fiber optical systems to locate an objective lens in front of the front end surface of the fiber optical system so as to focus the image of an object on the front end surfaces of the fiber optical system so as to transmit the image to the rear end surface of the fiber optical system, thereby permitting the observation or photographing of the image transmitted to the rear end surface. Such an optical system has been utilized in the medical field, for example, in gastro or intestinal cameras.

In these elongated optical systems it is desirable to make the outer diameter of the optical system as small as possible in view of the use thereof. Thus far, it has been vary difficult is such elongated optical systems to vary the magnification thereof by varying the focal length of the objective lens located in front of the elongated optical system without enlarging the outer diameter or lengthening the optical system.

SUMMARY OF THE INVENTION

An object of the present invention is to provide an elongated optical system of the kind described above which overcomes the difficulty in prior art optical systems so as to permit the magnification of the optical system to be easily varied without any adverse influence on the utilization of such optical system.

According to the present invention, an elongated optical system is provided which is characterized by an aperture diaphragm provided adjacent to the front focal point of the objective lens located in front of an image-transmitting optical system such as fiber optical system so that the principal light ray having passed through the objective lens becomes substantially parallel to the optical axis of the optical system, the objective lens being adapted to focus the image of an object on the front end surface of the image-transmitting optical system, the thus focused image being transmitted from the front end surface of the image-transmitting system therethrough to the rear end surface of the image-transmitting optical system, a selectively interchangeable lens system being selectively located in front of the aperture diaphragm a relatively great distance spaced therefrom, preferably at least a distance corresponding to 20 percent of the focal length of the interchangeable lens, so as to permit the magnification of the optical system to be varied from that obtainable by the objective lens per se without the interchangeable lens by suitably shifting the front end surface of the image-transmitting optical system in order to focus the image thereon.

The present invention is further characterized by the provision of a further additional lens system located adjacent to the aperture diaphragm in such a manner that the principal rear focal plane of the further additional lens system is brought to a position adjacent to the front focal point of the objective lens located in front of the image-transmitting optical system thereby permitting the rear focal plane of the combined optical system located in front of the image-transmitting optical system to be suitably shifted without varying the focal length of the combined optical system.

DESCRIPTION OF THE PREFERRED EMBODIMENTS

Figure 1:
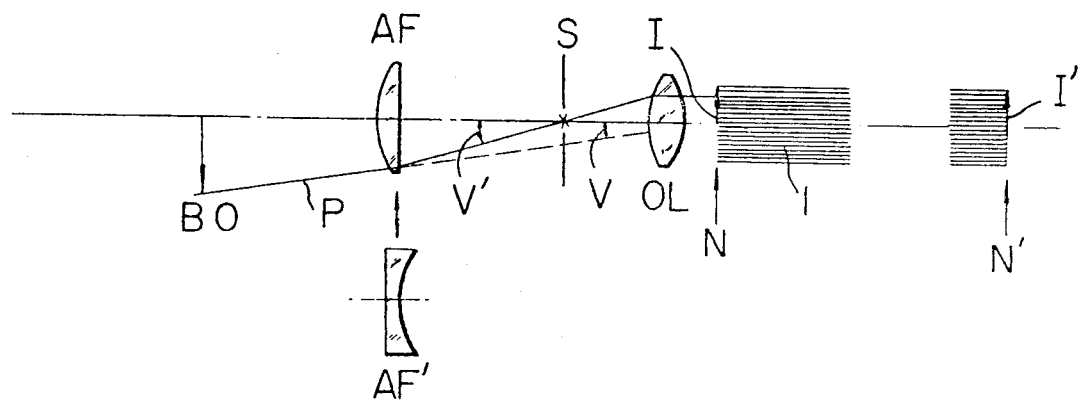
FIG. 1 is a diagrammatic view showing a first embodiment of the variable magnification optical system constructed in accordance with the present invention.

With reference to FIG. 1, an objective lens OL is located in front of the front end surface, i.e., image-receiving surface N, of a fiber optical system 1 which is adapted to transmit the image I of an object BO formed by the objective lens OL on the front end surface therethrough to the rear end surface N' so as to form image I' thereon. As aperture diaphragm S is provided at a position adjacent to the front focal point of the objective lens OL at the object side in such a manner that the principal light ray P emanating from the object BO and passing through the aperture diaphragm S and the objective lens OL becomes substantially parallel to the optical axis of the optical system at the image side. A convex lens AF, for example, is located in front of the aperture diaphragm S at a relatively great distance therefrom, preferably at least a distance corresponding to 20 percent of the focal length of the convex lens AF. Thus, the rear principal plane of the convex lens AF, i.e., the lens system located in front of the aperture diaphragm S, is shifted a substantial distance from the front focal point of the objective lens OL, i.e., the lens system located behind the aperture diaphragm S, thereby permitting the magnification of the entire optical system to be varied by the provision of the convex lens AF from that obtainable by the objective lens OL per se without the convex lens AF. Assuming the angular magnification of the convex lens AF with respect to the principal light ray P to be $m$, then the total magnification of the entire optical system will be $m$ times greater than the magnification of the optical system in which no such convex lens is provided. In this case, the angular magnification $m$ is given by the following formula:

$$m = \tan \overline{V}' / \tan \overline{V}$$

wherein $\overline{V}$ designates the angle formed between the principal light ray incident to the convex lens AF and the optical axis, and $\overline{V}'$ designates the angle formed between the principal light ray refracted by the convex lens AF by passing therethrough and the optical axis.

When such a convex lens AF is added to the optical system, the image-forming plane of the objective lens OL in which image I is focused will be shifted to a position nearer to the objective lens OL than in the case in which no such convex lens is provided.

Therefore, it is necessary to shift the image-receiving surface N, i.e., the front end surface of fiber optical system 1, to a position at which the image-receiving surface N coincides with the image-forming plane. In this case, however, since the principal light ray P passed through the objective lens OL is substantially parallel to the optical axis, the magnification of the formed image is not affected by the shifting of the image-forming plane.

It is evident that if the principal light ray passed through the objective lens OL is inclined with respect to the optical axis instead of being parallel thereto, the magnitude of the formed image will then be varied depending upon the position of the image-forming plane with respect to the objective lens OL, resulting in the variation in the angle of field. The change in the magnification of the optical system caused by the change in the angle of field results in the disadvantage that it attenuates the effect obtained by the addition of the convex lens AF, if the principal light ray P having passed through the objective lens OL is divergent. At the same time, if the principal light ray P passed through the objective lens OL is not parallel to the optical axis, decrease in the quantity of light in the marginal zone or of the quality of the image will often occur.

Therefore, the present invention provides the aperture diaphragm S at a position adjacent to the front focal point of the objective lens OL so as to eliminate the aforementioned disadvantage.

In the foregoing description, a single convex lens AF is located in front of the aperture diaphragm S. It will be apparent that a lens system comprised of a plurality of lens elements and having the same effect as the single convex lens can be substituted therefor.

When a single concave lens AF' or a lens system comprised of a plurality of lens elements having the same effect as the single concave lens AF' is located in the aforementioned optical system in place of the single convex lens AF or a lens system having the same effect as the single convex lens at a position in front of the aperture diaphragm S a relatively great distance spaced therefrom in like manner as in the case of the above-mentioned embodiment so that the rear principal plane of the concave lens AF' is shifted a substantial distance from the front focal point of the objective lens OL, the magnification ratio of the optical system will then be lessened from that obtainable by the objective lens OL per se without the concave lens AF', thereby enabling the observation or photographing of a field of wide angle.

As described above, a variable magnification lens system in an elongated image-transmitting optical system is obtained in accordance with the present invention by locating an aperture diaphragm at a position adjacent to the front focal point of the objective lens located in front of the focal end surface of the image-transmitting optical system and by adding a convex or concave lens system in front of the aperture diaphragm, the front end surface of the fiber optical system being suitably shifted so that it coincides with the image-forming plane of the optical system.

In case the shifting of the image-forming plane is too great, or if the image-forming plane is formed within the objective lens, it is advantageous to adopt measures as follows.

Figure 2:
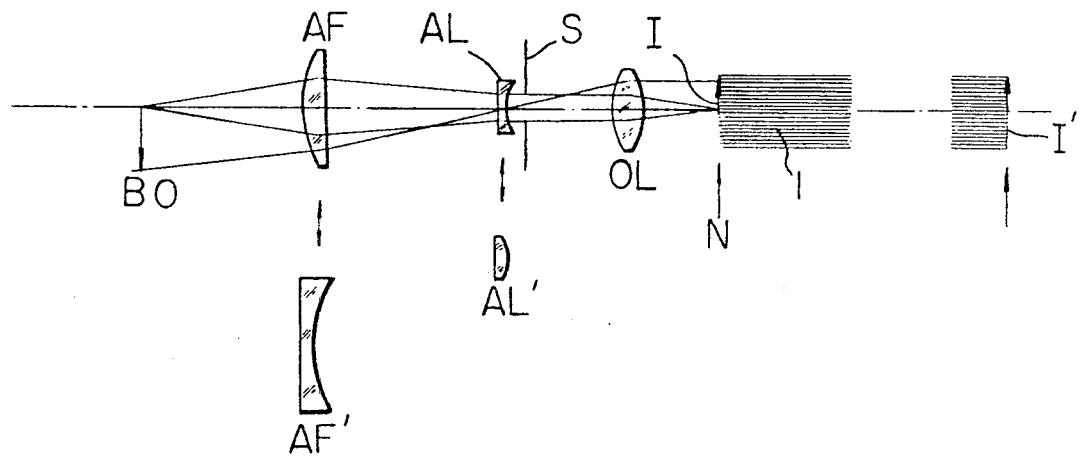
FIG. 2 is a diagrammatic view showing a second embodiment of the variable magnification optical system constructed in accordance with the present invention.

As shown in FIG. 2, when a convex lens AF, for example, is located in front of the aperture diaphragm S as in the case shown in FIG. 1, it often occurs that the image-forming plane is too close to the objective lens OL. In such a case, an additional concave lens AL is inserted in the optical system in such a manner that the rear principal plane of the concave lens AL coincides substantially with the front focal point of the objective lens OL. Then the rear focal plane of the entire optical system will be shifted to a position further from the objective lens OL without causing any change in the focal length of the entire optical system and without any change in the inclination of the principal light ray on the image side with respect to the optical axis, thereby permitting the front end surface of the image-transmitting optical system 1 to coincide with the image-forming plane of the objective lens OL.

In case a concave lens AF' is located in front of the aperture diaphragm S in place of the convex lens AF, it often happens that the position of the image-forming plane is shifted too far from the objective lens OL resulting in an unnecessarily long optical system. In such a case, an additional convex lens AL' is inserted in the optical system is such a manner that the rear principal plane of the convex lens AL' substantially coincides with the front focal point of the objective lens OL. Then, the rear focal plane of the entire optical system will be shifted toward the objective lens OL without causing any change in the focal length of the entire optical system and without causing any change in the inclination of the principal light ray on the image side with respect to the optical axis thereby permitting the length of the optical system to be shortened. Additional lenses AL and AL' may be replaced by lens systems comprising a plurality of lens elements but having the same effects, respectively.

Since the aperture diaphragm S is located adjacent to the front focal point of the objective lens OL as previously described, appropriate adjustment of the position of the rear focal point of the entire optical system, i.e., indirectly of the image-forming plane of the entire optical system can be achieved by selectively inserting an additional convex or concave lens system into a position adjacent to the aperture diaphragm S in the manner as described above.

The present invention has been described thus far in connection with the preferred embodiments thereof. It is evident that the present invention provides an elongated variable magnification optical system which permits easy inspection through a tube of small diameter without requiring any complicated means thereby affording easier and wider use in such applications as in gastro or intestinal cameras.

What is claimed is:

1. An elongated variable magnification optical system in which an objective lens is located in front of an image-transmitting fiber optical system, said objective lens being adapted to focus the image of an object on the front end surface of said image-transmitting optical system, wherein the improvement comprises an aperture diaphragm located at a position adjacent to the front focal point of said objective lens, selectively interchangeable lens system selectively added to said optical system in front of said aperture diaphragm at a relatively great distance therefrom preferably at least a distance corresponding to 20 percent of the focal length of said interchangeable lens system so that the rear principal plane of said interchangeable lens system is shifted a substantial distance from the front focal point of said objective lens, the end of the fiber optical system being movable to a position at which the image-receiving surface coincides with the image-forming plane thereby permitting the magnification of the entire optical system to be varied from that obtainable by said objective lens per se without said interchangeable lens system by interchanging said interchangeable lens system.

2. An elongated variable magnification optical system according to claim 1 further comprising a further additional lens system selectively located at a position adjacent to said aperture diaphragm in addition to said interchangeable lens system in such a manner that the rear principal plane of said further additional lens system is positioned adjacent to the front focal point of said objective lens thereby permitting the position of the image-forming plane resulting from the interchanging of said selectively interchangeable lens system to be shifted within an appropriate range without varying the focal length of the entire optical system.

3. An elongated variable magnification optical system according to claim 2 wherein said further additional lens system is comprised of a single concave lens so as to permit the position of the image formed by said objective lens to be shifted apart from said objective lens.

4. An elongated variable magnification optical system according to claim 2 wherein said further additional lens system is comprised of a single convex lens so as to permit the position of the image formed by said objective lens to be shifted toward said objective lens.

5. An elongated variable magnification optical system according to claim 2 wherein said further additional lens system is comprised of a plurality of lens elements which serve as a concave lens so as to permit the position of the image formed by said objective lens to be shifted apart from said objective lens.

6. An elongated variable magnification optical system according to claim 2 wherein said further additional lens system is comprised of a plurality of lens elements which serve as a convex lens so as to permit the position of the image formed by said objective lens to be shifted toward said objective lens.

7. An elongated variable magnification optical system according to claim 1 wherein said selectively interchangeable lens system is comprised of a single convex lens so as to magnify the image formed on the front end surface of said image-transmitting optical system.

8. An elongated variable magnification optical system according to claim 1 wherein said selectively interchangeable lens system is comprised of a single concave lens so as to reduce the image formed on the front end surface of said image-transmitting optical system.

9. An elongated variable magnification optical system according to claim 1 wherein said selectively interchangeable lens system is comprised of a plurality of lens elements which serve as a convex lens so as to magnify the image formed on the front end surface of the said image-transmitting optical system.

10. An elongated variable magnification optical system according to claim 1 wherein said selectively interchangeable lens system is comprised of a plurality of lens elements which serve as a concave lens so as to reduce the image formed on the front end surface of said image-transmitting optical system.

* * * * *